United States Patent [19]

Sato et al.

[11] Patent Number: 4,692,270

[45] Date of Patent: Sep. 8, 1987

[54] SURFACE ACTIVE AGENT

[75] Inventors: Atsushi Sato, Tokyo; Yoshikazu Murai, Yokohama; Tatsuo Yamaguchi, Hino; Kanji Mochizuki; Kunio Sugisawa, both of Yokohama, all of Japan

[73] Assignee: Nippon Petrochemicals Company, Limited, Tokyo, Japan

[21] Appl. No.: 783,225

[22] PCT Filed: Feb. 14, 1985

[86] PCT No.: PCT/JP85/00059

§ 371 Date: Sep. 23, 1985

§ 102(e) Date: Sep. 23, 1985

[87] PCT Pub. No.: WO85/03647

PCT Pub. Date: Aug. 29, 1985

[30] Foreign Application Priority Data

Feb. 14, 1984 [JP] Japan .................................. 59-24513

[51] Int. Cl.$^4$ ...................... B01F 17/02; B01F 17/12; C07C 139/06
[52] U.S. Cl. ................................ 252/353; 260/504 R; 260/505 N; 44/51
[58] Field of Search .................... 252/353; 260/504 R, 260/505 N; 44/51

[56] References Cited

U.S. PATENT DOCUMENTS

| 2,673,207 | 3/1954 | Trusler | 260/505 N |
| 2,915,517 | 12/1959 | LeSuer | 260/505 N |
| 3,030,410 | 4/1962 | Woodbridge et al. | 260/504 R |
| 3,798,261 | 3/1974 | Kemp | 260/504 R |
| 4,148,821 | 4/1979 | Nussbaum et al. | 252/353 X |
| 4,252,192 | 2/1981 | Nussbaum et al. | 252/353 X |
| 4,547,201 | 10/1985 | Tewari et al. | 44/51 X |

FOREIGN PATENT DOCUMENTS 29-1486 3/1954 Japan .
42-1536 1/1967 Japan .

Primary Examiner—John F. Terapane
Assistant Examiner—Catherine S. Kilby
Attorney, Agent, or Firm—Scully, Scott, Murphy & Presser

[57] ABSTRACT

A surfactant is obtained by treating a mixture of 20 to 95 wt. % of a thermal cracking oil fraction obtained by thermally cracking a petroleum heavy residual oil at 400° to 700° C., for example, by delayed coking and 80 to 5 wt. % of other aromatic source, for example, an aromatic fraction having a comparatively high boiling point with an acid catalyst, and sulfonating and neutralizing the product. This surfactant is used as a dispersing agent for a coal-oil mixture (COM).

7 Claims, No Drawings

4,692,270

SURFACE ACTIVE AGENT

FIELD OF ART

The present invention relates to a novel surface active agent and more particularly to a surface active agent comprising a product obtained by sulfonating a reaction product which results from treatment of a thermal-cracked oil obtained in a thermal cracking process using a petrolic heavy residual oil.

BACKGROUND OF ART

Recently, because of the exhaustion of petroleum resources, heavier crude oils have come to be used, thus giving rise to an increasing tendency of the amount of heavy oils by-produced such as residual oils in distillations. These heavy residual oils are of less industrial value by reason of their high viscosity or high sulfur and metal contents.

On the other hand, such heavy residual oils can be utilized in thermal cracking processes typified by coking, which may be the only utilization mode of those oils. From the heavy residual oil coking process is obtained a liquid substance, i.e., thermal-cracked oil, as well as coke and gas. Usually, the yield of the thermal-cracked oil in coking is fairly high, so there is obtained a large amount of thermal-cracked oil distillate.

Since the thermal-cracked oil thus obtained in a large amount contains a relatively large amount of aliphatic hydrocarbons and does not have a sufficiently high octane number, it has heretofore not been used directly as gasoline for automobiles, for which purpose it is required to be further subjected to a fluid catalytic cracking, for example. At most, it has been used merely as fuel for boilers. Therefore, how to utilize this large amount of thermal-cracked oil is becoming a serious industrial problem.

It has widely been conducted as what is called naphtha cracking to produce basic materials in the petrochemical industry such as ethylene and propylene by thermally cracking petrolic light hydrocarbons such as naphtha at 750°–850° C. In this case, 0.5 to 3.0 weight percent, based on the amount of ethylene produced, of thermal-cracked by-product oil containing a large amount of aromatic hydrocarbons is by-produced although the amount of this by-product oil differs depending on the kind of feed oil supplied to the thermal cracking apparatus, cracking conditions, etc.

Also, a reformate obtained in a large amount from a catalytic reforming also contains a large amount of aromatic hydrocarbons inevitably in which catalytic reforming naphtha is contacted with a noble metal catalyst such as Pt or $Pt-Re/Al_2O_3$ in the presence of hydrogen in order to improve the octane number or increase the content of aromatic hydrocarbons such as benzene, toluene and xylene to obtain those hydrocarbons.

Further, the residual oil after separation and removal of benzene, toluene and xylene from the above thermal-cracked by-product oil or reformate by a separating means such as solvent extraction is a distillate which mainly contains aromatic hydrocarbons of $C_9$ and $C_{10}$. However, this distillate is a mixture of many components and has heretofore not been fully utilized industrially because the separation into each component is difficult as one reason.

It is an object of the present invention to effectively utilize thermal-cracked oil distillates from heavy residual oils which have not so far been fully utilized industrially. It is another object of the invention to attain an effective utilization of residual oil in a BTX manufacturing process which is not in a sufficient industrial utilization. It is a further object of the present invention to provide a surface active agent which is inexpensive and yet superior in performance.

DISCLOSURE OF THE INVENTION

The present invention relates to a surface active agent obtained by sulfonating a reaction product boiling higher than hydrocarbons contained in a mixture and not lower than 260° C., under sulfonating conditions, followed by neutralization, which reaction product is obtained by treating the mixture in liquid phase in the presence of an acid catalyst at a reaction temperature of 0° to 330° C., said mixture consisting of:

(A) 20–95 weight percent of a thermal-cracked oil distillate obtained from a thermal cracking process for thermally cracking a petrolic heavy residual oil at a temperature not lower than 400° C. and not exceeding 700° C., said distillate consisting mainly of hydrocarbons boiling in the range of 120° to 290° C. and said distillate containing aliphatic olefins; and (B) 80–5 weight percent of one or more members boiling in the range of 150° to 250° C. and selected from the following (a) through (c):
  (a) a thermal-cracked by-product oil distillate obtained by thermal cracking of a petrolic light oil at a temperature of 750° to 850° C. followed by treatment for reducing the content of unsaturated compounds;
  (b) a reformate distillate obtained by catalytic reforming of a petrolic light oil boiling in the range of 50° to 250° C., followed by treatment for reducing the content of unsaturated compounds if necessary; and
  (c) an aromatic distillate consisting mainly of aromatic hydrocarbons and obtained by separation from the thermal-cracked by-product oil distillate of the above (a) and/or the reformate distillate of the above (b); or (C) 80–5 weight percent of aromatic hydrocarbons having a boiling range lower than 150° C. and not having an aliphatic double bond.

FORM FOR PRACTISING THE INVENTION

Examples of the petrolic heavy residual oil to be thermally cracked as referred to in (A) herein include bottom residues in atmospheric distillation, vacuum distillation and thermal or catalytic cracking, and various residues in petroleum refining, e.g. residual oils in extraction with furfural, propane, pentane, etc., residual oils in reformers, as well as mixtures thereof, in the ordinary sense in the petroleum refining industry.

In the thermal cracking process of the present invention, it is necessary that the cracking temperature should be not lower than 400° C. and should not exceed 700° C. If the cracking temperature is lower than 400° C., there will not occur a thermal cracking, and if it exceeds 700° C., regardless of the cracking time, the resulting thermal-cracked oil will contain excess aromatic hydrocarbons which per se are highly reactive, thus permitting an easy production of high polymers such as resins in the treatment with an acid catalyst, and the proportion of aliphatic olefins boiling in the range of 120° to 290° C. will become too small. Therefore, such temperatures outside the above-defined temperature range are not desirable. A preferable cracking temperature range is from 400° C. to 600° C., more preferably from 400° to 550° C. The cracking time may vary, depending on the main purpose of the thermal cracking process such as, for example, the production of coke or the reduction of viscosity of the starting heavy oil. For example, the cracking time may be selected from the range of 10 seconds to 50 hours. The cracking may be performed in the presence of steam or other non-reactive gaseous mediums. The cracking pressure, which usually is relatively low, is in the range from vacuum to 50 kg/cm² or so.

As typical examples of such thermal cracking process for heavy residual oils, mention may be made of the viscosity breaking process and the coking process, as described in the "Hydrocarbon Processing," Vol.61, No.9 (September 1982), pp.160–163.

The viscosity breaking process is a thermal cracking process mainly for lowering the viscosity of a feed material which is carried out under relatively mild cracking conditions while suppressing the formation of coke in a tubular heating furnace. It is classified into coil type and soaker type, in which are included the Lummus process and Shell process. Usually, the cracked oil leaving the cracking furnace is quenched for suppressing decomposition or the formation of coke.

In the coking process, which is a coke producing process, are included a delayed coking process (e.g. UOP process, Foster Wheeler process, M. W. Kellogg process, Lummus process and CONOCO process) in which the residual oil is once heated in a heating furnace for a relatively short time and then fed to a coke drum for forming an agglomerate coke over a relatively long period of time; a fluid coking process (e.g. Exxon process) in which the residual oil is thermally cracked over a high-temperature fluid coke; a flexicoking process (Exxon process) as a combination of the fluid coking process with a resultant coke gasifying process; and EUREKA process which performs not only a thermal cracking but also steam stripping at a relatively low pressure such as atmospheric pressure to produce pitch.

Among the thermal cracking processes mentioned above, the coking process is preferred because the sulfur and metal components in the residual oil are concentrated into the resulting coke so the content of these impurities in the cracked oil is relatively small and therefore the refining even after the acid catalyst treatment is relatively easy and also aliphatic olefins are contained in relatively large amounts in the cracked oil. Further, among these coking processes, the delayed coking process will bring about a great advantage, if it is utilized effectively by the present invention, because it is largely operated to obtain agglomerate cokes which are useful as a carbon source of graphite for electrodes, etc. and so it affords a very large amount of the cracked oil to be by-produced.

The compositions of the thermal-cracked oils obtained by the above-described thermal cracking processes differ according to types of the processes, thermal cracking conditions, kinds of the starting heavy oils, etc. Usually, however, those thermal-cracked oils, which scarcely contain aromatic olefins, mainly contain reactive aliphatic olefins such as n-olefins and iso-olefins in addition to n-paraffins and iso-paraffins, and further contain aromatic hydrocarbons having an alkyl-substituted single ring such as alkylbenzenes, having an alkyl-substituted composite ring such as alkylindanes and alkyltetralins and having an alkyl-substituted condensed ring such as alkylnaphthalenes.

Among the distillates from the thermal-cracked oils obtained in the above-described thermal cracking processes, the distillate to be processed in the present invention is one which consists mainly of hydrocarbons boiling in the range of 120° to 290° C., preferably 150° to 260° C. Distillates consisting mainly of hydrocarbons whose boiling range is outside the above-defined range cannot afford reaction products useful as surface active agents and are therefore not desirable. It is necessary that the thermal-cracked oil distillate to be processed in the invention should contain aliphatic olefins. Preferably, the content of aliphatic olefins is at least 10 weight percent. If it is lower than 10 weight percent, the yield of the reaction product and that of the surface active agent will be decreased, so such lower content is not desirable.

A typical composition of the thermal-cracked oil distillate is 30 to 70 weight percent paraffins, 10 to 40 weight percent aliphatic olefins and 5 to 20 weight percent aromatic hydrocarbons. However, as long as the above-mentioned conditions required of the distillate are satisfied, the thermal-cracked oil may be subjected to fractionation or diluted with unreacted oil.

The following description is now provided about the thermal-cracked by-product oil distillate (a), reformate distillate (b) and aromatic distillate (c), as component (B) to be mixed with the thermal-cracked oil distillate (A).

The thermal-cracked by-product oil distillate (a) is obtained when a petrolic light oil is thermally cracked at a temperature of 750° to 850° C. with a view to producing ethylene and propylene. It has been subjected to a treatment for selectively reducing the content of unsaturated compounds such as diolefins and monoolefins.

As examples of the petrolic light oil are mentioned naphtha, kerosene, light oil, LPG and butane. In consideration of properties of the resulting thermal-cracked by-product oil, naphtha, kerosene and light oil are preferred as starting materials in the thermal cracking because those oils are more suitable for the objects of the present invention.

The method of thermal cracking is not specially limited. Various conventional thermal cracking methods carried out at 750°–850° C., for example, the method using a tubular cracking furnace and the method using a heat-transfer medium, can be adopted.

The thermal-cracked by-product oil distillate obtained from the thermal-cracked product after removal of olefins and diolefins such as ethylene, propylene and butadiene as the object products is a distillate having 6 to 10 carbon atoms, containing a relatively large amount of aromatic hydrocarbons and containing 2 to 10 weight percent paraffins, 3 to 10 weight percent naphthenes, 55 to 85 weight percent aromatic hydrocarbons, 2 to 10 weight percent aliphatic olefins and 2 to 15 weight percent aromatic olefins, although this differs depending on the kind of the starting petrolic light oil and thermal cracking conditions. Used in the present invention is the distillate boiling in the range of 150° to 280° C., which is mixed with the thermal-cracked oil distillate (A).

Provided, however, that the thermal-cracked by-product oil distillate used in the present invention is subjected, before use, to a treatment for decreasing the content of unsaturated compounds such as olefins to not higher than 0.5%, preferably not higher than 0.1%.

This treatment is attained by a conventional catalytic hydrogenation treatment. For example, metal catalysts such as Pt, Pd, Ni, Co, Mo, W, Co-Mo and Ni-W, or catalysts obtained by supporting these metals on a carrier such as alumina, may be used. Conditions for this treatment usually involve reaction temperatures of 200° to 400° C., hydrogen pressures of 20 to 150 kg/cm$^2$, hydrogen/oil mole ratios of 0.5 to 20 and LHSV values of 0.1 to 10.

The reformate distillate (b) is obtained by catalytic reforming of a petrolic light oil boiling in the range of 50° to 250° C., e.g. a straight-run naphtha. Catalytic reforming has been widely conducted in the fields of petroleum refining and petrochemistry for improving the octane number or for obtaining BTX, i.e. benzene, toluene and xylene. It is carried out at a reaction temperature of 450° to 510° C. in the presence of hydrogen, using a metal catalyst such as platinum, platinum-rhenium, molybdenum oxide or chromium oxide supported on alumina or silica-alumina. As industrial methods, mention may be made of platforming of UOP Co. which is a fixed bed type and Ultraforming of Standard Oil Co. which is also a fixed bed type. In addition, fluidized bed type and moving bed type catalytic reforming methods are also employable. In the catalytic reforming, there mainly occur dehydrogenation and cyclization reaction, as well as isomerization reaction; as a result, the BTX (benzene, toluene and xylene) content increases and the octane number is improved. However, the resulting reformate has a bromine number not more than about 3.8 and thus the content of unsaturated compounds is very low, as compared with the thermal-cracked by-product oil (a). A more preferable bromine number is not larger than about 2.

The catalytic reformate distillate typically has 6 to 10 carbon atoms and contain 30 to 35 weight percent paraffins, 65 to 70 weight percent aromatic hydrocarbons and 0 to 2 weight percent olefins. The catalytic reformate distillate which may be used in the present invention is of a boiling range from 150° to 280° C.

Thus, the reformate distillate is very low in the content of unsaturated compounds, but if necessary, it is subjected to a treatment may be performed in the same way as in the foregoing treatment for decreasing like content in the thermal-cracked by-product oil distillate (a).

Further, an aromatic distillate consisting mainly of aromatic hydrocarbons, obtained from the catalytic reformate, the thermal-cracked by-product oil, or a mixture thereof, using a suitable separating means, is employable as the aromatic distillate (c). This separation has been performed on a large scale in the petrochemical field for obtaining BTX from catalytic reformate oils or thermal-cracked by-product oils usually according to a solvent extraction process or extractive distillation process. Typical solvent extraction processes include Udex process (Dow process) which employs diethylene glycol or triethylene glycol as an extraction solvent and Sulfolane process (Shell process) which employs sulfolane as an extraction solvent. Usually, this extraction is preceeded by a treatment such as a catalytic hydrogenation to remove unsaturated components selectively for preventing the apparatus from being blocked by polymerization of those components.

Among the aromatic distillates consisting mainly of aromatic hydrocarbons thus obtained by separation from catalytic reformate oils or thermal-cracked by-product oils, the one boiling in the range of 150° to 250° C. [the aromatic distillate (c) in (B) of the present invention] consists principally of $C_9$ to $C_{10}$ aromatic hydrocarbons. It contains alkylbenzenes, polyalkylbenzenes, naphthalene and many other aromatic hydrocarbons. However, the distillate of this boiling range has heretofore not been utilized effectively although it is obtained in a large amount together with the BTX distillate.

Examples of the aromatic hydrocarbons (C) having a boiling range lower than 150° C. and not having an aliphatic double bond, to be mixed with the thermal-cracked oil distillate (A), are benzene, toluene, xylene, ethylbenzene, and mixtures thereof.

In the present invention, the thermal-cracked oil distillate (A) is mixed with the distillate (B) boiling in the range of 150° to 250° C. which is the thermal-cracked by-product oil distillate (a), the reformate distillate (b) or the aromatic distillate (c), and the mixture is treated with an acid catalyst. The distillates (a) to (c) may be used in combination. Further, the thermal-cracked oil distillate (A) may also be mixed with the aromatic distillate (C) boiling lower than 150° C., followed by the acid catalyst treatment. The mixing ratio is as follows: 20 to 95 weight percent, preferably 40 to 90 weight percent, of the thermal-cracked oil distillate (A), and 80 to 5 weight percent, preferably 60 to 10 weight percent, of the distillate (B) boiling in the range of 150° C. to 250° C. or the aromatic hydrocarbons (C) boiling lower than 150° C.

Preferred examples of the acid catalyst are solid acid catalysts, mineral acids, so-called Friedel-Crafts catalysts and organic acids. More concrete examples include solid acid catalysts such as acid clay minerals typified by acid clay and activated clay, amorphous or crystalline silica-alumina, $AlF_3 \cdot Al_2O_3$ and strong acid type ion-exchange resins; Friedel-Crafts catalysts such as HF, $AlCl_3$, $BF_3$ and $SnCl_4$, as well as complex catalysts thereof; and inorganic and organic acids such as sulfuric acid, p-toluenesulfonic acid and trifluoromethanesulfonic acid.

The reaction may be carried out according to any of batch process, semi-batch process and flow process. But, where a solid acid is used, the flow process is preferred.

The acid catalyst is used in an amount of 0.2 to 20 weight percent, preferably 1 to 10 weight percent, based on the weight of the hydrocarbon feed in the batch process. In the flow process, the treatment is performed at a liquid hourly space velocity (LHSV) of 0.1 to 20, preferably 0.5 to 10. The reaction temperature is in the range of 0° to 300° C., preferably 0° to 250° C. The treating time, which differs according to reaction conditions such as the amount of catalyst used, reaction temperature and feed composition, should be long enough to complete the reaction, and usually it is selected from the range of 2 to 24 hours. The reaction pressure is not specially limited if only it can maintain the reaction system in liquid phase.

The acid catalyst treatment is performed so as to give a reaction product having a boiling range higher than that of main hydrocarbons in the feed mixture and not lower than 260° C. Treating conditions which suppress disproportionation or oligomerization of olefins are preferred because of a superior surface activity of the sulfonated product, and in this connection, HF or a complex thereof with $H_2O$ is preferred as catalyst, for example.

If the boiling range of the reaction product thus obtained by the above treatment is lower than 260° C. or lower than the boiling range of main hydrocarbons in the feed mixture, the surface activity of the sulfonated product will be inferior, so such reaction product is not desirable.

In the present invention, as described above, since the specific distillate from the specific source is used as a feed material and subjected to the specific treatment, a high molecular weight compound which badly affects physical properties is substantially not produced, and the reaction product obtained is a liquid product having a relatively low viscosity, for example, in the range of 3 to 20 cSt at 75° C.

Therefore, what is required after the acid catalyst treatment is merely separating from the reaction mixture the starting thermal-cracked oil distillate (unreacted distillate) of a lower boiling range and the aromatic hydrocarbons which were added and mixed to the thermal-cracked oil distillate. The reaction product can be recovered and used without further separation of heavier compounds. Of course, the reaction product may be divided into fractions of suitable boiling ranges if necessary.

Prior to the subsequent sulfonation, the above reaction mixture or reaction product may be subjected to a selective hydrogenation of unsaturated compounds such as olefins so as not to cause a substantial hydrogenation of the aromatic nucleus, if necessary. However, it is usually recommended that the reaction product be fed to the subsequent sulfonation step without going through the hydrogenation.

Next, the reaction product is sulfonated with a sulfonating agent under sulfonation conditions.

As the sulfonating agent there may be used a known one, examples of which include concentrated sulfuric acid, fuming sulfuric acid and sulfuric anhydride ($SO_3$)

Where concentrated sulfuric acid is used, water is produced as the sulfonation proceeds. It is therefore recommended to distill off the water by azeotropy or use an excess amount of concentrated sulfuric acid.

Where $So_3$ is used for the sulfonation, it is recommended to dilute it with an inert gas such as nitrogen.

The amount of the sulfonating agent used is not specially limited if only it permits the sulfonation to be performed to a satisfactory extent. But, usually the sulfonating agent is used in an amount of 0.1 to 1.0 part by weight per part by weight of the reaction mixture.

The sulfonation temperature is in the range of 0° to 100° C., preferably 20° to 80° C. If it is lower than 0° C., the sulfonation will not proceed, and if it is higher than 100° C., a tarry matter is easily produced. Therefore, temperatures outside the above range are not desirable. The sulfonation time is not specially limited, either. Usually, it is in the range of about 30 minutes to about 2 hours.

The sulfonation reaction may be carried out according to a batch process or a continuous process using a flow-down thin film type reaction vessel.

After completion of the reaction, the sulfonated product is neutralized. The neutralization may be effected using an organic compound such as ammonia or an amine. Usually, however, it is performed using an alkali metal such as solid or potassium or an alkali metal hydroxide.

The neutralized product can be used as a surface active agent directly or after drying.

INDUSTRIAL UTILIZABILITY

The surface active agent of the present invention has the following features.

(1) According to the present invention, cracked oil from a heavy residual oil thermal cracking process can be utilized effectively and hence surplus heavy residual oils of low industrial value can be utilized effectively in large amounts. Thus, the present invention is of great industrial value.

(2) The sulfonated product obtained sulfonating the reaction product is superior in surface activity, so it is useful as inexpensive surface active agents such as an emulsifier, a dispersant and a detergent. For example, it is useful as a dispersant used in the production of a mixed fuel (COM) of pulverized coal and hydrocarbon oils such as petroleum, which has been proposed as a new energy.

(3) Since the distillate of a specific composition from a specific source is subjected to the acid catalyst treatment, there is no substantial production of such a high polymer as badly affects physical properties. There is obtained a product of a relatively low viscosity. Thus, there is the advantage that what is required after the acid catalyst treatment and before use of the reaction product in the sulfonation is only removal of unreacted distillate.

EXAMPLES

The following examples are given to further illustrate the present invention.

EXAMPLE 1

From a delayed coking apparatus (cracking conditions: temperature 496° C., residence time 24 hours, pressure 4 kg/cm$^2$) for coking a residual oil in vacuum distillation of such properties as shown in Table 1 obtained from Minas crude oil there was obtained a thermal-cracked oil in addition to gases and coke as shown in Table 2.

TABLE 1

| Properties of the heavy residual oil | |
| --- | --- |
| | Minas vacuum-distilled bottom residue |
| Specific gravity (@ 15° C.) API | 20 |
| Asphaltene, wt. % | 2.6 |
| Conradson residual carbon, wt. % | 7.1 |

TABLE 2

| Yield | |
| --- | --- |
| | Yield (wt. %) |
| Butane and light gas | 8 |
| 30-160° C. (Distillate No. 1) | 13 |
| 160-260° C. (Distillate No. 2) | 22 |
| 260° C.+ (Distillate No. 3) | 40 |
| Coke | 17 |
| Total | 100 |

Among the thermal-cracked oil distillates shown in the above Table 2, Distallate No.2 was used as the feed material, whose composition is as set out in Table 3 below.

TABLE 3

| Feed Composition | |
|---|---|
| | (Distillate No. 2) 160–260° C. |
| Bromine number, cg/g | 20.2 |
| Type analysis | |
| Paraffins | 68.3 |
| Aliphatic olefins | 19.4 |
| Aromatics | 12.3 |
| Aromatic olefins | — |

Then, a mixed solution consisting of 300 ml benzene and 600 ml anhydrous hydrogen fluoride (purity: 99% or more) was placed in a batch type reactor (internal volume: 5l) held at 5° C., and allowed to cool sufficiently. Then, under vigorous stirring, a mixture consisting of 400 ml distillate boiling in the range of 160° to 220° C. as a further distillate from Distillate No.2 in Table 3 and 300 ml benzene was added dropwise over a period of 10 minutes, and thereafter the stirring was continued for 1 hour. Thereafter, the reaction mixture was allowed to stand, then the oil layer was separated and treated with a 10 weight percent potassium hydroxide solution to neutralize and decompose the incorporated anhydrous hydrogen fluoride, which was removed by washing with water. After a sufficient dehydration there was obtained 85.3 g (10.2% yield) of reaction product as a 260° C.+ distillate. This reaction product was found to have a viscosity of 3.5 cSt (@ 75° C.), a pour point not higher than −55° C. and a flash point of 144° C.

Test of Dispersant

A 260°–330° C. boiling distillate was recovered at a percent recovery of 88.1% from the reaction product (unhydrogenated product) obtained above. Sulfonation was performed using this distillate, and the following test was conducted.

95.1 g of the 260°–330° C. distillate was placed in a glass vessel having a volume of 500 ml, into which was then introduced 19 ml of sulfuric anhydride together with a nitrogen gas stream over a period of 1 hour, under vigorous stirring, while maintaining the temperature at 50° C., to effect sulfonation. Thereafter, the contents of the vessel were added with stirring to 148.2 g of 6.7% sodium hydroxide aqueous solution and neutralized to a ending point of pH 7.0–7.5. The amount of the contents added was 81.1 g. As a result of analysis, the yield of the sulfonated product was found to be 84.4%.

Then, a sodium salt of the sulfonic acid thus obtained was checked for its surface activity as a dispersant.

More particularly, under the conditions set out in Table 4, 0.2 part of a sodium salt of the sulfonic acid was dissolved in 1.5 part of water, then 70 parts of fuel oil B was added. After mixing throughly, 30 parts of pulverized coal was added and stirring was made thoroughly, then the sedimentation velocity of the pulverized coal was measured. As a result, sedimentation of the pulverized coal was not recognized even after standing for over 50 days. On the other hand, in the absence of the sulfonate, the pulverized coal settled and separated at once.

TABLE 4

| Pulverized coal used | 200 mesh passing: 85% |
|---|---|
| Fuel oil used | Fuel oil B |
| | (90 cp @ 28° C., 17 cp @ 70° C.) |
| Pulverized coal concentration | 30 wt. % |
| Measurement temperature | 30° C. |

Test of Detergent

A cotton cloth stained with oil was cut into two. One was six times in soft water at 30° C., while the other was washed each three times at 30° C. in soft water containing the sodium sulfate obtained above and in soft water, alternately. The degree of detergence was evaluated visually in comparison with the case where the sulfonated product was not used. A sufficient detergent effect was recognized, and the degree of detergence was almost the same as in the use of a commercially available straight-chain sodium alkylbenzenesulfonate type detergent.

EXAMPLE 2

8.4 g of anhydrous aluminum chloride was added to a mixture (11.6% olefins) consisting of 400 ml xylene distillate, the xylene distillate having the composition of Table 5 below and boiling in the range of 135° to 145° C., and 600 ml thermal-cracked oil distillate (Distillate No.2) obtained in Example 1. After treating at 130° C. for 1 hour according to a batch process, the reaction mixture was treated with ammonia water to neutralize and decompose the catalyst. Subsequent dehydration afforded 79.4 g (9.5% yield) of reaction product as a 260° C.+ distillate. The reaction product proved to have a bromine number of 1.0 cg/g, contain 98% aromatics and the balance consisting mostly of olefins, have a viscosity of 5.3 cSt (@ 75° C.), a pour point of −50° C. and a flash point of 172° C.

TABLE 5

| Xylene distillate | |
|---|---|
| Component | wt. % |
| Ethylbenzene | 55.8 |
| p-Xylene | 10.4 |
| m-Xylene | 20.7 |
| o-Xylene | 11.8 |
| Others | 1.3 |
| Total | 100.0 |

The above reaction product was then sulfonated and neutralized in the same way as in Example 1. The yield of the sulfonated product was 79.8%. Then, the sulfonated product was tested for surface activity as a dispersant in the same manner as in Example 1. As a result, pulverized coal did not settle even after standing for over 50 days.

EXAMPLE 3

A by-product oil distillate boiling in the range of 61° to 250° C. was obtained from a tubular cracking furnace for thermal-cracking of naphtha at 780°–810° C. for the production of ethylene and propylene. This by-product oil distillate contained large amounts of aromatic hydrocarbons such as benzene, toluene, xylene and styrene in addition to acetylenes and diolefins.

This distillate was then subjected to a hydrogenation treatment using a Unifining two-stage hydrogenation apparatus for the removal of unsaturated compounds such as diolefins and desulfurization. As catalyst there was used an alumina-supported cobalt-molybdenum catalyst. The first-stage hydrogenation was performed at a temperature of 220° C. and a pressure of 50 kg/cm², and the second-stage hydrogenation was performed at 330° C. and 50 kg/cm². The thermal-cracked by-product oil distillate thus hydrogenated containing not more than 0.01% of sulfur and also not more than 0.01% of unsaturated compounds, will hereinafter be referred to as distillate (a).

In the next place, a reformate was obtained from a Platforming apparatus for a catalytic reforming of naphtha having a boiling range of 50° to 250° C. by the use of a platinum catalyst in the presence of hydrogen at a reaction temperature of 470° C. and pressure of 50 kg/cm² for the product of gasoline and benzene, toluene or xylene. This reformate also contained large amounts of aromatics, but had a less content of unsaturated components than that of the foregoing thermal-cracked by-product oil distillate. This reformate distillate, having a bromine number of about 1.0, will hereinafter be referred to as distillate (b).

Then, 90 vol. % of the reformate distillate (b) having a boiling range of 60° to 250° C. was mixed with 10 vol. % of a fraction having the same boiling range obtained from the distillate (a) (thermal-cracked by-product oil distillate), and the mixture was fed to a Udex extractor to recover an aromatics distillate.

More specifically, the mixture was fed to a middle portion of an aromatics extraction column, while ethylene glycol as an extraction solvent was fed from an upper portion of the column, and thus a countercurrent extraction was performed. After refining of the extract, there were produced benzene, toluene and xylene. At this time, an aromatic distillate having a boiling range of 150° to 250° C. was by-produced as a distillate of $C_9$ or more. This aromatic distillate, containing 99% or more aromatics, will be hereinafter referred to as distillate (c). Table 6 below shows properties of a fraction (distillate (c')) having a boiling range of 160° to 180° C. obtained from the distillate (c).

TABLE 6

| Properties | Boiling Range 160-180° C. (distillate (c')) |
|---|---|
| Specific gravity @ 60° F./60° F. | 0.876 |
| Saybolt color | +30 or more |
| Flash point (PMCC) | 45 |
| Blended aniline point | 13 |
| Aromatics (vol. %) | 99.5 |
| Distillation Properties (ASTM) | |
| Initial boiling point, °C. | 160 |
| Dry point, °C. | 176 |

5 ml of $BF_3 \cdot H_2O$ was added to a mixture (17.5% olefins) consisting of 450 ml of the thermal-cracked oil distillate (Distillate No.2) obtained in Example 1 and 50 ml of the above distillate (c') (aromatic distillate). After treating at 90° C. for 5 hours according to a batch process, the reaction mixture was treated with an aqueous ammonia and the catalyst was removed by washing with water. After a sufficient dehydration there was obtained 72 g (17.8% yield) of reaction product as a 315° C.+ distillate. The reaction product proved to have a viscosity of 7.2 cSt (@ 75° C.), a pour point of −50° C. and a flash point of 180° C. It was then sulfonated and neutralized in the same manner as in Example 1. The yield of the sulfonated product was 80.3%.

Using the sulfonated product, the sedimentation velocity of pulverized coal was measured in the same way as in Example 1 to thereby check the surface activity as a dispersant. Even after the lapse of 50 days, there was not recognized sedimentation of the pulverized coal.

EXAMPLE 4

Manufacturing Example 1

5 g of $AlCl_3$ was added to a mixture (9.7% olefins) consisting of 250 ml Distillate No.2 (thermal-cracked oil distillate) obtained in Example 1 and 250 ml Distillate (c') (aromatic distillate) obtained in Example 3. After treating at 185° C. for 1.5 hours according to a batch process, the reaction mixture was treated with an aqueous ammonia to neutralize the catalyst, which was removed by washing with water. After a sufficient dehydration there was obtained 43.2 g (10.4% yield) of reaction product as a 315° C.+ distillate. The reaction product was found to have a viscosity of 6.5 cSt (@ 75° C.), a pour point of −50° C. and a flash point of 180° C.

Manufacturing Example 2

5 g of $AlCl_3$ was added to a mixture (4.0% olefins) consisting of 100 ml Distillate No.2 (thermal-cracked oil distillate) obtained in Example 1 and 400 ml Distillate (c')(aromatic distillate) obtained in Example 3, followed by treatment in the same way as in Manufacturing Example 1, to obtain 27.1 g (6.4% yield) of reaction mixture as a 315° C.+ distillate. This product was found to have a viscosity of 4.0 cSt (@ 75° C.), a pour point of −50° C. and a flash point of 180° C.

Manufacturing Example 3

5 g of $AlCl_3$ was added to a mixture (17.5% aliphatic olefins) consisting of 450 ml Distillate No.2 (thermal-cracked oil distillate) obtained in Example 1 and 50 ml Distillate (c')(aromatic distillate), followed by treatment in the same way as in Manufacturing Example 1, to obtain 98.4 g (24.4% yield) of reaction product as a 315° C. + distillate. The reaction product was found to have a viscosity of 10.4 cSt (@ 75° C.), a pour point of −47.5° C. and a flash point of 180° C.

Test as Dispersant

The reaction products obtained in Manufacturing Examples 1 to 3 were sulfonated and neutralized in the same way as in Example 1, to obtain their sulfonated products at yields of 70.2%, 80.2% and 62.1%, respectively.

Then, using those sulfonated products, the surface activity as a dispersant was checked from the sedimentation velocity of pulverized coal in the same manner as in Example 1. In any of the sulfonated products, sedimentation of pulverized coal was not recognized even after the lapse of 50 days.

What is claimed is:

1. A water soluble surface active agent obtained by sulfonating a reaction product boiling higher than hydrocarbons contained in a mixture and not lower than 260° C., under sulfonating conditions, followed by neutralization, which reaction product is obtained by treating said mixture in liquid phase in the presence of an acid catalyst at a reaction temperature of 0° to 330° C. to alkylate aromatics with aliphatic olefins followed by distillation, said mixture consisting of:

(A) 20-95 weight percent of a thermal-cracked oil distillate obtained from a delayed coking process for coking a petrolic heavy residual oil at a temperature not lower than 400° C. and not exceeding 700° C., said distillate containing aliphatic olefins; and, either (B) 80–5 weight percent of one or more members boiling in the range of 150° to 250° C. and selected from the following (a) through (c):
  (a) a thermal-cracked by-product oil distillate obtained by thermal cracking of a petrolic light oil at a temperature of 750° to 850° C. followed by treatment for reducing the content of unsaturated compounds;
  (b) an reformate distillate obtained by catalytic reforming of a petrolic light oil boiling in the range of 50° to 250° C., followed by treatment for reducing the content of unsaturated compounds if necessary; and
  (c) an aromatic distillate consisting mainly of aromatic hydrocarbons and obtained by separation from said thermal-cracked by-product oil distillate (a) and/or said reformate distillate (b); or
(C) 80–5 weight percent of aromatic hydrocarbons having a boiling range lower than 150° C. and not having an aliphatic double bond.

2. A surface active agent as set forth in claim 1, wherein said acid catalyst is hydrogen fluoride, aluminum chloride, or a complex thereof.

3. A surface active agent as set forth in claim 1, wherein said treatment for reducing the content of unsaturated compounds is a selective catalytic hydrogenation treatment for olefins.

4. A surface active agent as set forth in claim 1, wherein said aromatic distillate (c) is obtained by a solvent extraction or an extractive distillation from said thermal-cracked by-product oil distillate (a) and/or said reformate distillate (b).

5. A surface active agent as set forth in claim 1, wherein said sulfonation is performed at a temperature of 0° to 100° C.

6. A surface active agent as set forth in claim 1, wherein said sulfonation is performed using concentrated sulfuric acid, fuming sulfuric acid or sulfuric anhydride.

7. A surface active agent as set forth in claim 1, wherein said neutralization is performed using an alkali metal or an alkali metal hydroxide.

* * * * *